(12) United States Patent
Saravani

(10) Patent No.: US 10,072,568 B2
(45) Date of Patent: Sep. 11, 2018

(54) VARIABLE DISPLACEMENT HYPOCYCLOIDAL CRANKSHAFT

(71) Applicant: Amir Aghabeygi Saravani, Tehran (IR)

(72) Inventor: Amir Aghabeygi Saravani, Tehran (IR)

( * ) Notice: Subject to any disclaimer, the term of this patent is extended or adjusted under 35 U.S.C. 154(b) by 0 days.

(21) Appl. No.: 15/421,390

(22) Filed: Jan. 31, 2017

(65) Prior Publication Data

US 2018/0216521 A1 Aug. 2, 2018

(51) Int. Cl.
F02B 75/04 (2006.01)
F02B 75/18 (2006.01)
F16H 37/12 (2006.01)
F16C 3/06 (2006.01)

(52) U.S. Cl.
CPC ............ F02B 75/047 (2013.01); F02B 75/18 (2013.01); F16C 3/06 (2013.01); F16H 37/124 (2013.01)

(58) Field of Classification Search
CPC .......... F02B 75/047; F02B 75/18; F16C 3/06; F16H 37/124
See application file for complete search history.

(56) References Cited

U.S. PATENT DOCUMENTS 8,714,134 B2 * 5/2014 De Gooijer ............. F02B 41/04
123/197.4
2013/0269658 A1 * 10/2013 O'Donnell ............. F02D 15/02
123/48 R

FOREIGN PATENT DOCUMENTS

JP 2009-209759 A * 9/2009

* cited by examiner

*Primary Examiner* — Kevin A Lathers

(57) ABSTRACT

A variable displacement hypocycloidal crankshaft includes a crankshaft, a hypocycloidal gear assembly, an external pin, and an angle-setting device. The crankshaft mounted in a chassis houses the piston assembly. The hypocycloidal gear assembly includes an internal gear and an external gear. The crankshaft is mounted on the chassis coaxially with the internal gear and rotates freely in the center of the internal gear. Then, the external gear is mounted on the crankshaft movable pin and engaged with the internal gear thereby rotating the external gear. The external pin operably engages the piston assembly. The angle-setting device mounted on the chassis operably engages the internal gear. The angle-setting device is coaxial to the hypocycloidal gear assembly for selectively varying the linear displacements of the piston assembly. The external gear meshes with the internal gear for converting the continuous rotation of the crankshaft to varying linear displacements of the piston assembly.

6 Claims, 7 Drawing Sheets

VARIABLE DISPLACEMENT HYPOCYCLOIDAL CRANKSHAFT

BACKGROUND OF THE INVENTION

Crankshafts are mechanical components that perform a conversion between a rotational motion and a reciprocating motion. The crankshaft is attached to a piston assembly for conversion of the rotational motion to the reciprocating motion. Typically, the linear displacement produced by the piston assembly in the engine cylinder is constant once running and cannot be varied during operation. Conventional crankshafts lack the ability to vary the linear displacement of the piston assembly during operation. A crankshaft, which is capable of varying the linear displacement of the piston assembly during operation, is required. Additionally, in conventional crankshafts, if a force or a substance prevents the piston from reaching the top or bottom dead center, the crank stops or it damages one of the parts. The crankshaft is not flexible and stops operating when the crank meets resistance. A crankshaft, which is flexible and functions even when the crank meets resistance, is required.

Traditionally, in multi-cylinder engines that use conventional crankshafts, the motion of piston of a cylinder cannot be changed relative to other cylinders. For instance, the motion of each piston of the multi-cylinder engine cannot be decreased separately. A crankshaft, which permits the motion of each piston of the multi-cylinder engine to be varied separately, is required. Additionally, over the years, various mechanisms for converting rotational motion to reciprocating linear motion have been developed. Some of these mechanisms have the ability to change the amount of linear motion. Each of the mechanisms devised have various disadvantages, which limit the use of them. For instance, to perform a reciprocating motion with different lengths, hydraulic cylinders along with hydraulic pump are used. However, this method uses high energy, is highly complex, and involves high cost of construction. As another solution, pneumatic cylinders along with a pump perform a reciprocating motion with different lengths, but with lower accuracy.

The use of the pump and the pneumatic cylinder has several disadvantages, for example, consumes high energy, is highly complex, has a high cost of construction, has low accuracy, and a slow reaction. In addition, another popular method is the use of the electric linear actuator system with an electric generator. This method also suffers similar drawbacks, for example, high-energy consumption, high complexity, and high cost of construction. A crankshaft, which provides varying linear displacements without high-energy consumption and has a low cost of construction, is required.

Hence, there is a long felt but unresolved need for a crankshaft, which is capable of varying the linear displacement of the piston assembly during operation. Moreover, there is a need for a crankshaft, which is flexible and works well even when the crank meets resistance. Furthermore, there is a need for a crankshaft, which provides varying linear displacements without high-energy consumption and has a low cost of construction.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The variable displacement hypocycloidal crankshaft, disclosed herein, addresses the above-mentioned need for a crankshaft, which is capable of varying the linear displacement of the piston assembly during operation. Additionally, the invention addresses the need for a crankshaft, which is flexible and works well even when the crank meets resistance. Furthermore, the invention addresses the need for a crankshaft, which provides varying linear displacements without high-energy consumption and has a low cost of construction. In the variable displacement hypocycloidal crankshaft, the reciprocating linear motion can be reduced more than 86 percent. With this invention, if in the bottom half of the cylinder, a force or a substance prevents the piston to move; the crankshaft without damaging other parts continues its rotation. With this invention installed in a multi-cylinder engine, the motion of each piston can be decreased separately more than 86% while producing a continuous rotation in the crankshaft.

The variable displacement hypocycloidal crankshaft includes a crankshaft, a hypocycloidal gear assembly, an external pin, and an angle-setting device. The crankshaft is mounted in a chassis for housing the piston assembly. The hypocycloidal gear assembly includes an internal gear and an external gear. The crankshaft mounted in the chassis is coaxial to the internal gear. In one example, the crankshaft mounted in the chassis is coaxial to the internal gear and the external gear. The crankshaft is positioned between the internal gear and the external gear. The crankshaft freely rotates thereby rotating the internal gear. The external pin is configured on the external gear to operably engage the piston assembly. The angle-setting device is mounted on the chassis and operably engaged to the internal gear. The angle-setting device is coaxial to the hypocycloidal gear assembly for selectively varying the linear displacements of the piston assembly. The external gear meshes with the internal gear of the hypocycloidal gear assembly for converting the continuous rotation of the crankshaft to varying linear displacements of the piston assembly.

One aspect of the present disclosure is directed to a variable displacement hypocycloidal crankshaft for converting a continuous rotation of a crankshaft to varying linear displacements of a piston assembly. The variable displacement hypocycloidal crankshaft comprises: (a) the crankshaft mounted in a chassis; (b) a hypocycloidal gear assembly comprising an internal gear and an external gear, wherein the crankshaft mounted in the chassis is coaxial to the internal gear, and wherein the crankshaft freely rotates thereby rotating the internal gear. Then, the external gear is mounted on the crankshaft movable pin. The variable displacement hypocycloidal crankshaft further comprises (c) an external pin configured on the external gear to operably engage the piston assembly; (d) an angle-setting device mounted on the chassis, the angle setting device operably engaged to the internal gear, wherein the angle-setting device is coaxial to the hypocycloidal gear assembly for selectively varying the linear displacements of the piston assembly; and (e) wherein the external gear meshes with the internal gear of the hypocycloidal gear assembly for converting the continuous rotation of the crankshaft to varying linear displacements of the piston assembly.

In one embodiment, the piston assembly comprises a connecting rod and a piston, wherein the connecting rod is operably engaged to the piston at a first end of the connecting rod, and wherein the connecting rod is operably engaged to the external pin at a second end of the connecting rod for converting the continuous rotation of the crankshaft to the linear displacement of the piston. In another embodiment of the variable displacement hypocycloidal crankshaft, a radius of the crankshaft is about twenty-five percent of the maximum linear displacement of the piston assembly. In one embodiment of the variable displacement hypocycloidal crankshaft, the pitch diameter of the internal gear equals the maximum linear displacement of the piston assembly. In another embodiment, the pitch diameter of the internal gear is double the pitch diameter of the external gear. In one embodiment, the linear displacements of the piston assembly is varied by modifying the angle set by the angle-setting device. In another embodiment, the rotation of the internal gear is restricted to ninety degrees.

One aspect of the present disclosure is directed to a variable displacement hypocycloidal crankshaft for converting a continuous rotation of a crankshaft to varying linear displacements of a piston assembly. The variable displacement hypocycloidal crankshaft comprises: (a) the crankshaft mounted in a chassis configured to house the piston assembly; (b) a hypocycloidal gear assembly comprising an internal gear and an external gear, wherein the crankshaft mounted in the chassis is coaxial to the internal gear and the external gear, wherein the crankshaft is positioned between the internal gear and the external gear, and wherein the crankshaft freely rotates thereby rotating the internal gear; (c) an external pin configured on the external gear to operably engage the piston assembly; (d) an angle-setting device mounted on the chassis, the angle setting device operably engaged to the internal gear, wherein the angle-setting device is coaxial to the hypocycloidal gear assembly for selectively varying the linear displacements of the piston assembly; and (e) wherein the external gear meshes with the internal gear of the hypocycloidal gear assembly for converting the continuous rotation of the crankshaft to varying linear displacements of the piston assembly.

Another aspect of the present disclosure is a variable displacement hypocycloidal crankshaft for converting a continuous rotation of a crankshaft to varying linear displacements of a piston assembly. The variable displacement hypocycloidal crankshaft comprises (a) the crankshaft mounted in a chassis configured to house the piston assembly; (b) a hypocycloidal gear assembly comprising an internal gear and an external gear, wherein the crankshaft mounted in the chassis is coaxial to the internal gear, wherein the crankshaft freely rotates in the center of the internal gear thereby rotating the internal gear, and wherein the external gear is mounted on a crankshaft movable pin; (c) an external pin configured on the external gear to operably engage the piston assembly; (d) an angle-setting device mounted on the chassis, the angle setting device operably engaged to the internal gear, wherein the angle-setting device is coaxial to the hypocycloidal gear assembly for selectively varying the linear displacements of the piston assembly; and (e) wherein the external gear meshes with the internal gear of the hypocycloidal gear assembly for converting the continuous rotation of the crankshaft to varying linear displacements of the piston assembly.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The present invention generally relates to crankshafts of internal combustion engines. More particularly, the invention disclosed herein relates to a variable displacement hypocycloidal crankshaft for converting a continuous rotation of a crankshaft to varying linear displacements of a piston assembly.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
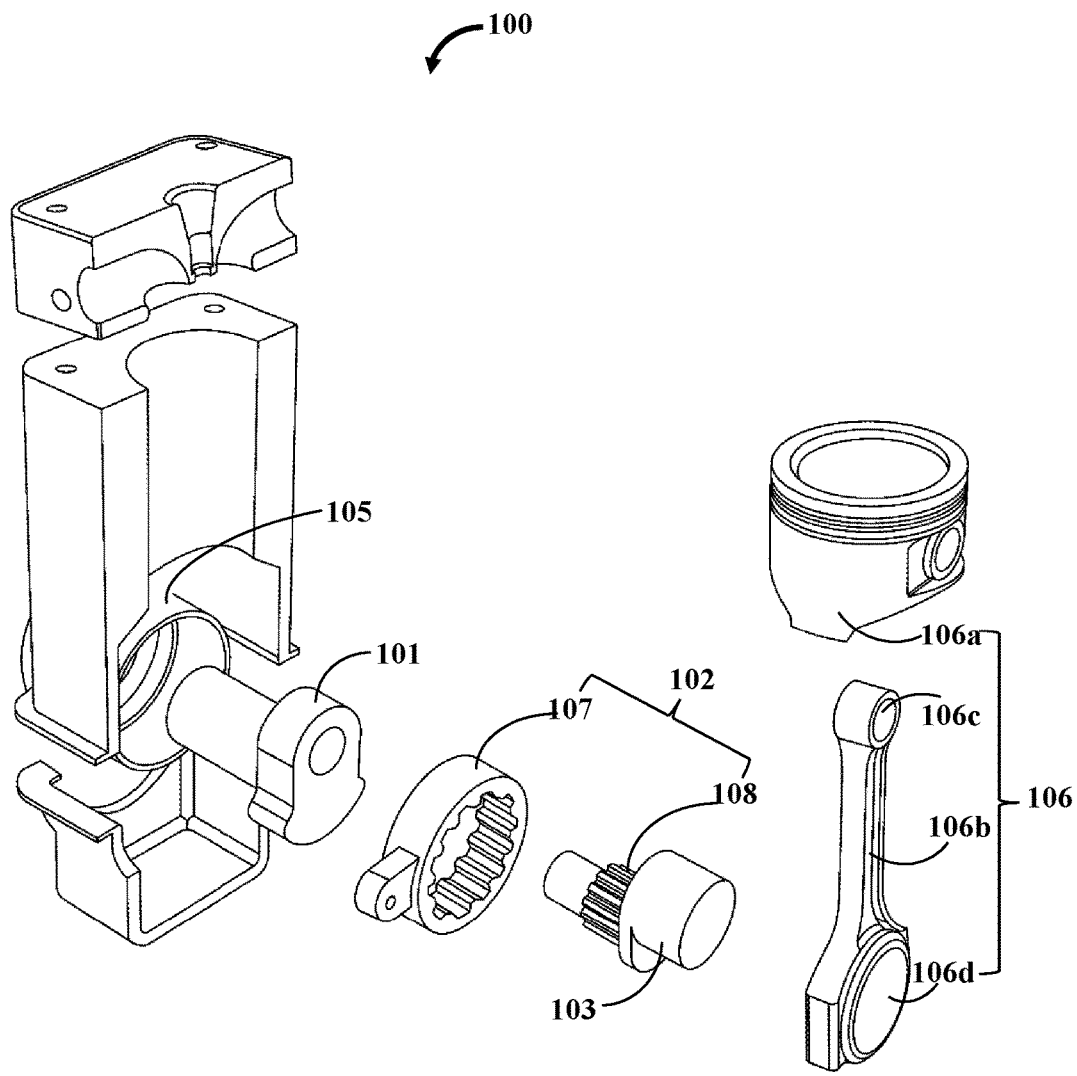
FIG. 1 exemplarily illustrates an exploded view of a variable displacement hypocycloidal crankshaft.

FIG. 1 exemplarily illustrates an exploded view of a variable displacement hypocycloidal crankshaft 100. The variable displacement hypocycloidal crankshaft 100 comprises a crankshaft 101, a hypocycloidal gear assembly 102, an external pin 103, and an angle-setting device 104. The angle-setting device 104 is exemplarily illustrated in FIGS. 2A-2B. The crankshaft 101 is mounted in a chassis 105 configured to house the piston assembly 106. The piston assembly 106 comprises a piston 106a and a connecting rod 106b. The connecting rod 106b is operably engaged to the piston 106a at a first end 106c of the connecting rod 106b. The connecting rod 106b is operably engaged to the external pin 103 at a second end 106d of the connecting rod 106b for converting the continuous rotation of the crankshaft 101 to the linear displacement of the piston 106a.

The hypocycloidal gear assembly 102 comprises an internal gear 107 and an external gear 108. The crankshaft 101 mounted in the chassis 105 is coaxial to the internal gear 107. In one example, The crankshaft 101 is positioned between the internal gear 107 and the external gear 108. The external gear 108 may be mounted on the crankshaft movable pin 101. The external pin 103 is configured on the external gear 108 to operably engage the piston assembly 106.

Figure 2A:
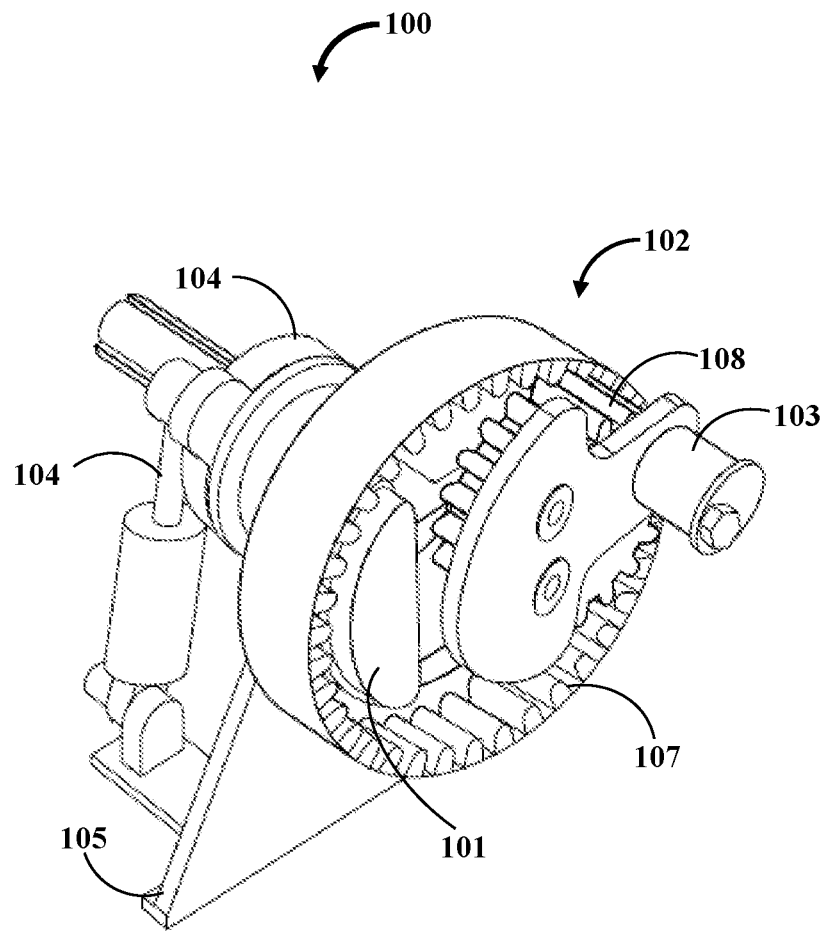
FIG. 2A exemplarily illustrates a perspective view of a variable displacement hypocycloidal crankshaft disengaged from a piston assembly.
Figure 2B:
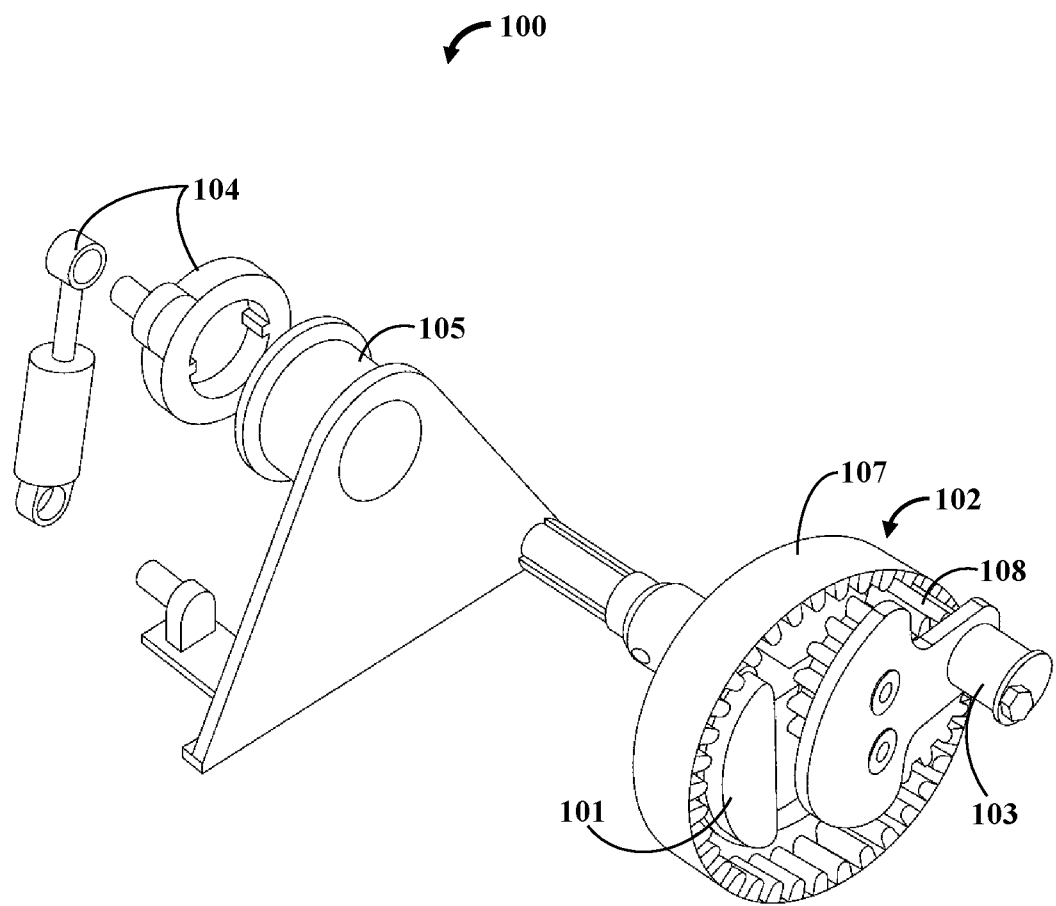
FIG. 2B exemplarily illustrates an exploded view of a variable displacement hypocycloidal crankshaft disengaged from a piston assembly.

The angle-setting device 104 is mounted on the chassis 105 and the angle-setting device 104 is operably engaged to the internal gear 107 of the hypocycloidal gear assembly 102 as exemplarily illustrated in FIGS. 2A-2B. The angle-setting device 104 is coaxial to the hypocycloidal gear assembly 102 for selectively varying the linear displacements of the piston assembly 106. The external gear 108 meshes with the internal gear 107 of the hypocycloidal gear assembly 102 for converting the continuous rotation of the crankshaft 101 to varying linear displacements of the piston assembly 106. The variable displacement hypocycloidal crankshaft 100 enables a rotation of the crankshaft 101 to be converted to the linear reciprocating motion of the piston assembly 106 with different lengths and vice versa.

The variable displacement hypocycloidal crankshaft 100 is simple in design and construction. Moreover, the variable displacement hypocycloidal crankshaft 100 has the potential to substitute conventional crankshaft 101 with minimal changes in other parts. In an embodiment, the variable displacement hypocycloidal crankshaft 100 is capable of reducing the amount of linear displacement more than about 86 percent.

The variable displacement hypocycloidal crankshaft 100 has the capability to control separately the displacement of the piston assemblies 106 of a multi-cylinder engine. Additionally, the variable displacement hypocycloidal crankshaft 100 is flexible when the piston 106a faces with opposition. In an embodiment, a power capacitor is used in the mechanism changing the angle in order to prevent damaging in the case of facing with inhibitor force in the linear displacement direction and continue to work.

The power capacitor can be a spring. In case of blocking the motion direction of the piston 106a in the cylinder, spring stores power by gathering and lets the internal gear 107 change the angle. The crankshaft linear displacement is reduced by changing the angle of the internal gear 107 using the angle-setting device 104 as exemplarily illustrated in FIGS. 2A-2B. This angle change will continue to reach the external pin 103 to the end of the motion direction and begins to return. The force stored in the spring returns to the system in the external pin 103 return direction, and returns the internal gear 107 to its original position.

In an embodiment, the variable displacement hypocycloidal crankshaft 100 is used to produce a variable compression reciprocating piston engine. Variable compression engines exert varying compression ratios during operation for consuming less fuel under varying loads. Additionally, in the variable displacement hypocycloidal crankshaft 100, the piston 106a and the connecting rod 106b of the piston assembly 106, exemplarily illustrated in FIG. 1, are two separate pieces. The connecting rod 106b operates in a linear motion, which eliminates friction on the side of the piston 106a. The internal gear 107 rotates about 90 degrees on its axis, linear displacement of the piston 106a reaches the minimum limit, and passes about 14% of the cylinder direction.

The flexibility of the crankshaft 101 allows us to raise the engine compression ratio without fear of premature ignition. Therefore, the engine is capable of using fuel with the highest compression ratio. In another embodiment, the variable displacement hypocycloidal crankshaft 100 can be used to create variable displacement impact press and for multistage stretching of metals. Furthermore, the variable displacement hypocycloidal crankshaft 100 finds application in various machines, for example, packaging machines, printing machines, agricultural machinery, machine-building industry, etc.

FIG. 2A exemplarily illustrates a perspective view of a variable displacement hypocycloidal crankshaft 100 disengaged from a piston assembly 106. FIG. 2B exemplarily illustrates an exploded view of a variable displacement hypocycloidal crankshaft 100 disengaged from a piston assembly 106. The piston assembly 106 is exemplarily illustrated in FIG. 1. The variable displacement hypocycloidal crankshaft 100 comprises a crankshaft 101, a hypocycloidal gear assembly 102, an external pin 103, and an angle-setting device 104. The crankshaft 101 performs similar to a conventional crankshaft. In the preferred embodiment, the radius of the crankshaft 101 is equal to 25% of the maximum linear motion generated by this mechanism. The main shaft of the crankshaft 101 is the rotational motion output in this mechanism. The hypocycloidal gear assembly 102 comprises an internal gear 107 and an external gear 108.

As exemplarily illustrated in FIGS. 2A-2B, in the chassis 105, the crankshaft 101 rotates freely in the center of the internal gear 107. Then, the external gear 108 is mounted on the crankshaft movable pin 101. The internal gear 107 has a pitch circle diameter (PCD) equal to the maximum amount of linear displacement to be generated by the piston 106a of the piston assembly 106.

The external gear 108 has a pitch circle diameter (PCD) equal to half the PCD of the internal gear 107. This gear module is equal to the internal gear 107. Thus, number of teeth of the external gear 108 is half the number of teeth of the internal gear 107. The external pin 103 that is fixed on the peripheral line of the external pitch circle. In fact, the external pin 103 is a fixed point on the external gear 108. The external pin 103 indicates the location of the connecting rod 106b mounted on the variable displacement hypocycloidal crankshaft 100. The angle-setting device 104 is a device through which the amount of linear displacement is changed manually or automatically in the variable displacement hypocycloidal crankshaft 100. The chassis 105 is a component on which the remaining components of the variable displacement hypocycloidal crankshaft 100 are mounted. In an embodiment, the chassis 105 is the body of the same device for which the crankshaft 101 was designed.

The hypocycloidal gear assembly 102 is first assembled and then mounted on the chassis 105 as exemplarily illustrated in FIGS. 2A-2B. First, the internal gear 107 is mounted on the chassis 105 so that it can freely rotate around its axis. In the next step, the crankshaft 101 is mounted on the chassis 105 coaxially with the internal gear 107. In this case, the crankshaft 101 rotates freely in the center of the internal gear 107. Then, the external gear 108 is mounted on the crankshaft movable pin. In this case, the external gear 108 is engaged with the internal gear 107. Then, the angle-setting device 104 is connected to both the chassis 105 and the internal gear 107.

When the angle-setting device 104 is mounted, the rotation of the internal gear 107 about the axis of the internal gear 107 is restricted to 90 degrees. In one embodiment, the rotation of the internal gear 107 about the axis of the internal gear 107 is restricted to +/−90 degrees. In the next step, the output shaft is fixed on the external gear 108. To use this invention, the existing crankshaft 101 is replaced with the variable displacement hypocycloidal crankshaft 100 in a piston assembly 106 of an internal combustion engine as exemplarily illustrated in FIG. 1. The connecting rod 106b which is connected to the piston 106a on one side is installed on the output shaft. Then, the angle-setting device 104 sets the rotational motion of internal gear 107 relative to the engine block.

Figure 3A:
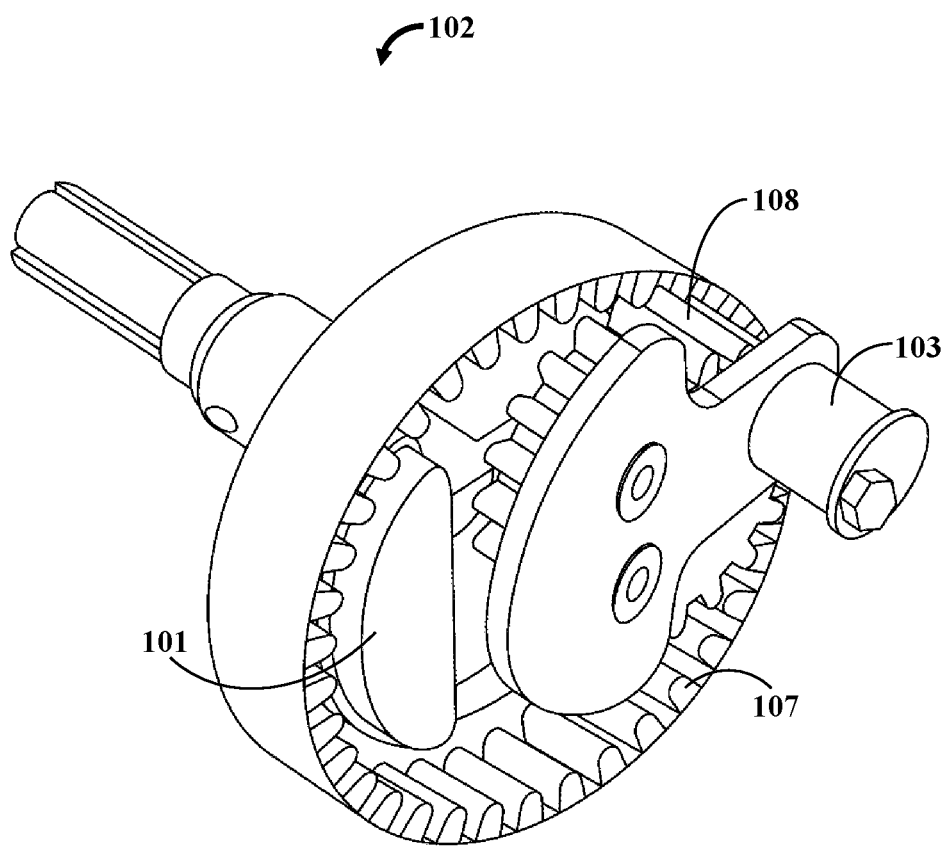
FIG. 3A exemplarily illustrates a perspective view of a hypocycloidal gear assembly.
Figure 3B:
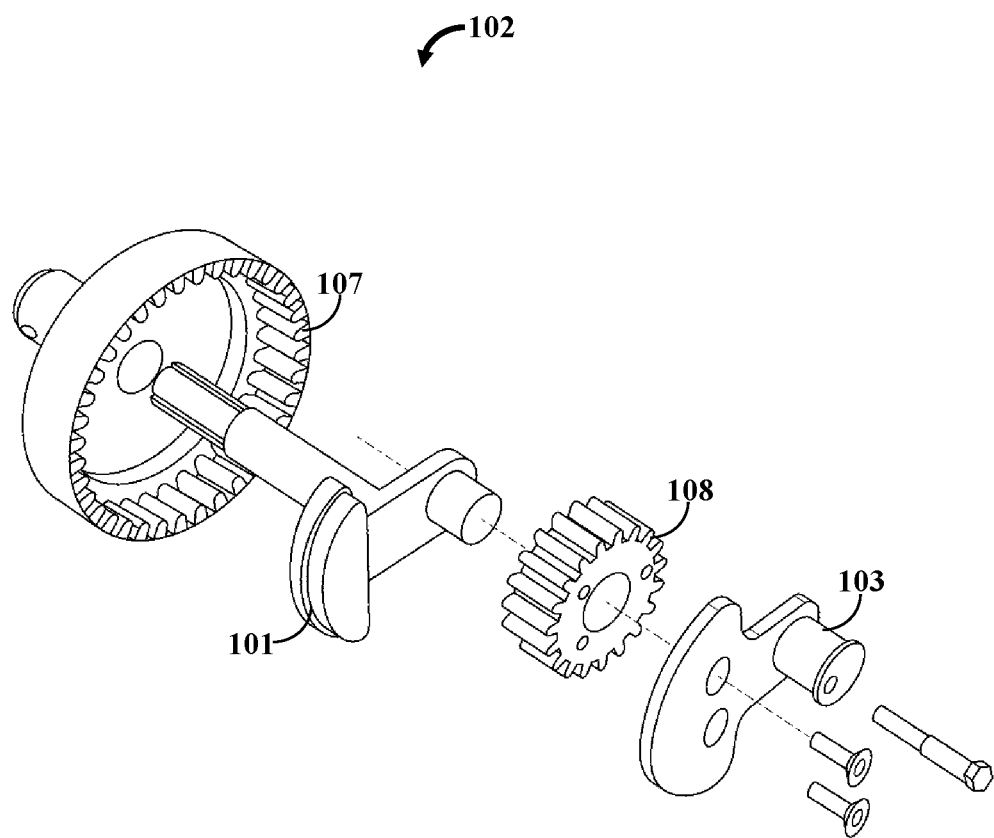
FIG. 3B exemplarily illustrates an exploded view of a hypocycloidal gear assembly.

FIG. 3A exemplarily illustrates a perspective view of a hypocycloidal gear assembly 102. FIG. 3B exemplarily illustrates an exploded view of a hypocycloidal gear assembly 102. The hypocycloidal gear assembly 102 is first assembled and then mounted on the chassis 105 as exemplarily illustrated in FIGS. 2A-2B. First, the internal gear 107 is mounted on the chassis 105 so that it can freely rotate around its axis. In the next step, the crankshaft 101 is mounted on the chassis 105 coaxially with the internal gear 107. In this case, the crankshaft 101 rotates freely in the center of the internal gear 107. Then, the external gear 108 is mounted on the crankshaft movable pin. In this case, the external gear 108 is engaged with the internal gear 107.

By turning the crankshaft 101 fixed axis in a clockwise direction, it can be seen that the external wheel which is mounted on the crankshaft 101 moving axis and involved with the teeth of the internal gear 107 on one side starts rotating in a counter clockwise direction. The external pin 103 that is fixed on the external gear 108 is moved on a straight line from the top dead center and while crossing the central point of the crankshaft 101 reaches bottom dead center. Then, the external pin 103 reversely passes through the same direction and returns to the top dead center.

When motion direction of the external pin 103 is parallel to the cylinder, the piston 106a, exemplarily illustrated in FIG. 1, will have the greatest displacement. By changing the angle, we will see an angle between the internal gear 107 of the external pin 103 motion direction with cylinder. The higher the angle, the lower the linear displacement of the piston 106a in the cylinder will be. When the angular motion of the external pin 103 with the cylinder reaches 90 degrees, linear displacement of the piston 106a reaches the minimum limit, and passes about 14% of the cylinder direction.

Figure 4:
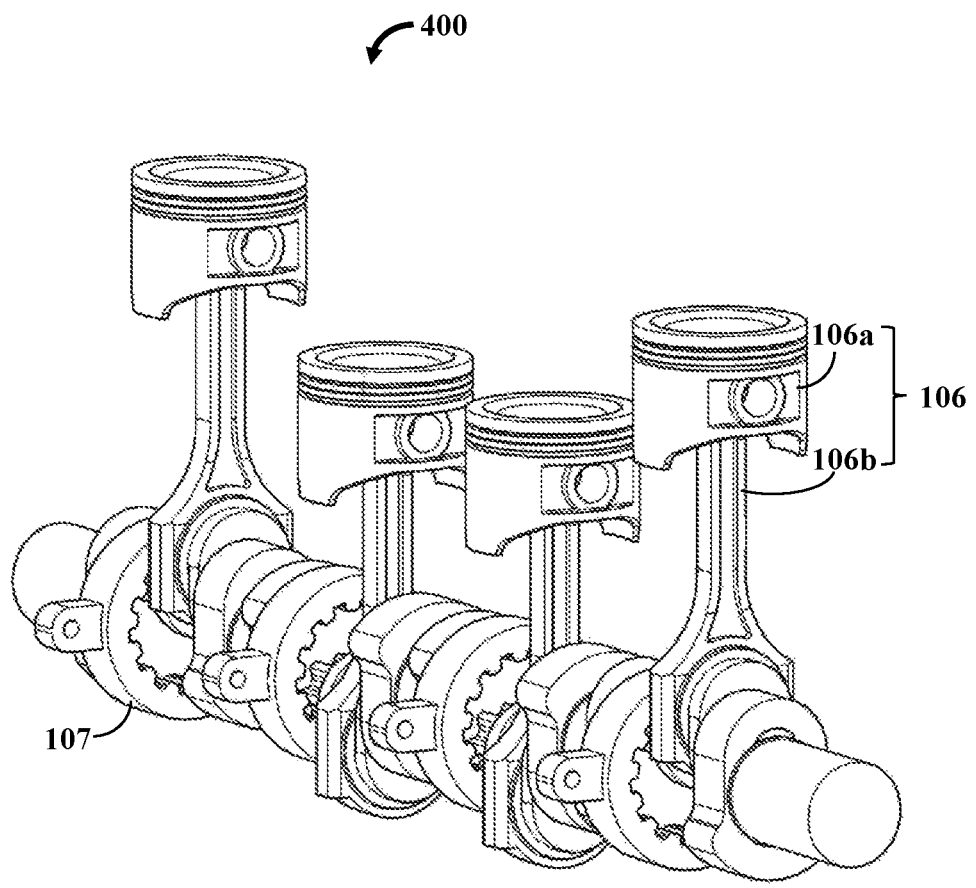
FIG. 4 exemplarily illustrates hypocycloidal gear assemblies changing the location of the axis of the crankshaft of a multi-cylinder engine.

FIG. 4 exemplarily illustrates hypocycloidal gear assemblies 102 changing the location of the axis of the crankshaft 101 of a multi-cylinder engine 400. In the functioning of the variable displacement hypocycloidal crankshaft 100, the connecting rod 106b has no angular motion only in the state of maximum displacement and by reducing the amount of linear displacement, the connecting rod 106b has angular motion. The introduction of the variable displacement hypocycloidal crankshaft allows individual control of the pistons of the multi-cylinder engine 400. In this way, the location of the moving axis of the crankshaft 101 is changed with the internal gear 107, exemplarily illustrated in FIGS. 1-3B. The external gear 108 is installed on the moving axis of the crankshaft 101, which shifts outside the center attached to it.

The external gear 108 is meshed with the large internal gear 107 as exemplarily illustrated in FIGS. 1-3B. The large internal gear 107 controls the angle of gear of shift. In this way, the amount of change of linear displacement is limited. The variable displacement hypocycloidal crankshaft 100 produces a high rate of change of linear displacement, reducing the amount of linear displacement more than 86%. Additionally, the variable displacement hypocycloidal crankshaft 100 is simple in design and allows easy replacement of the conventional crankshafts 101 with minimal changes in other parts. The variable displacement hypocycloidal crankshaft 100 improves the chart of piston motion in cylinder as exemplarily illustrated in FIG. 5.

One aspect of the present disclosure is directed to a variable displacement hypocycloidal crankshaft 100 for converting a continuous rotation of a crankshaft 101 to varying linear displacements of a piston assembly 106. The variable displacement hypocycloidal crankshaft 100 comprises: the crankshaft 101 mounted in a chassis 105 configured to house the piston assembly 106; and a hypocycloidal gear assembly 102 comprising an internal gear 107 and an external gear 108, wherein the crankshaft 101 mounted in the chassis 105 is coaxial to the internal gear 107. The crankshaft 101 is mounted on the chassis 105 coaxially with the internal gear 107. In this case, the crankshaft 101 rotates freely in the center of the internal gear 107. Then, the external gear 108 is mounted on the crankshaft movable or external pin 103. In this case, the external gear 108 is engaged with the internal gear 107 thereby rotating the external gear 108.

The variable displacement hypocycloidal crankshaft 100 further comprises an external pin 103 configured on the external gear 108 to operably engage the piston assembly 106; an angle-setting device 104 mounted on the chassis 105, the angle setting device 104 is operably engaged to the internal gear 107, wherein the angle-setting device 104 is coaxial to the hypocycloidal gear assembly 102 for selectively varying the linear displacements of the piston assembly 106. The variable displacement hypocycloidal crankshaft 100 is such the external gear 108 meshes with the internal gear 107 of the hypocycloidal gear assembly 102 for converting the continuous rotation of the crankshaft 101 to varying linear displacements of the piston assembly 106.

One aspect of the present disclosure is directed to a variable displacement hypocycloidal crankshaft for converting a continuous rotation of a crankshaft to varying linear displacements of a piston assembly. The variable displacement hypocycloidal crankshaft may comprise the crankshaft mounted in a chassis configured to house the piston assembly; and a hypocycloidal gear assembly comprising an internal gear and an external gear, wherein the crankshaft mounted in the chassis is coaxial to the internal gear, wherein the crankshaft freely rotates in the center of the internal gear thereby rotating the internal gear, and wherein the external gear is mounted on a crankshaft movable pin. In one example, the crankshaft is mounted on the chassis coaxially with the internal gear. In this case, the crankshaft rotates freely in the center of the internal gear, and then the external gear is mounted on the crankshaft movable pin, and the external gear is engaged with the internal gear thereby rotating the external gear.

The variable displacement hypocycloidal crankshaft may further comprise an external pin configured on the external gear to operably engage the piston assembly; and an angle-setting device mounted on the chassis, the angle setting device operably engaged to the internal gear, wherein the angle-setting device is coaxial to the hypocycloidal gear assembly for selectively varying the linear displacements of the piston assembly. The variable displacement hypocycloidal crankshaft may further be configured such that the external gear meshes with the internal gear of the hypocycloidal gear assembly for converting the continuous rotation of the crankshaft to varying linear displacements of the piston assembly.

Figure 5:
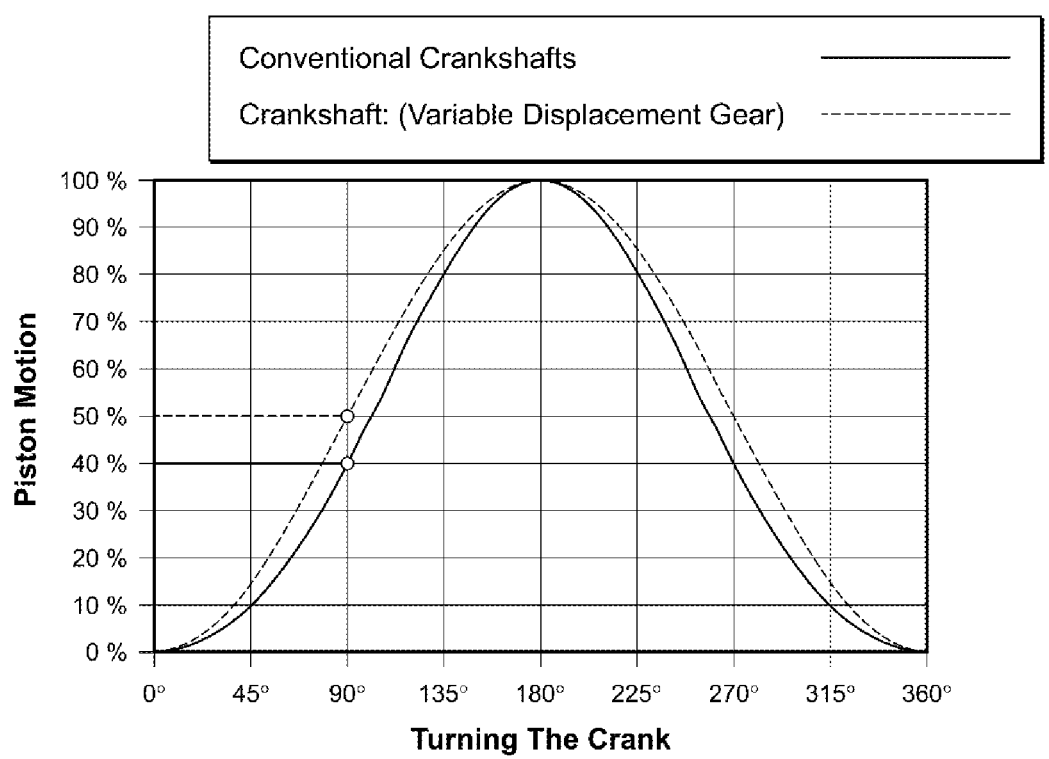
FIG. 5 exemplarily illustrates a graphical representation of the percentage of piston displacement plotted against friction conditions.

FIG. 5 exemplarily illustrates a graphical representation of the percentage of piston displacement plotted against friction conditions. The variable displacement hypocycloidal crankshaft 100 has no negative effect on the chart of piston motion in the cylinder as exemplarily illustrated in FIG. 5.

The piston assembly 106 may comprise a connecting rod 106b and a piston 106a. The connecting rod 106b is operably engaged to the piston 106a at a first end 106c of the connecting rod 106b. The connecting rod 106b is operably engaged to the external pin 103 at a second end 106d of the connecting rod 106b for converting the continuous rotation of the crankshaft 101 to the linear displacement of the piston 106a. In one example of the variable displacement hypocycloidal crankshaft 100, a radius of the crankshaft 101 is about twenty-five percent of the maximum linear displacement of the piston assembly 106.

The variable displacement hypocycloidal crankshaft 100 may be configured such that the pitch diameter of the internal gear 107 equals the maximum linear displacement of the piston assembly 106. The pitch diameter of the internal gear 107 may be, in one example, double the pitch diameter of the external gear 108. In another example, the linear displacements of the piston assembly 106 is varied by modifying the angle set by the angle-setting device 104.

In one example of the variable displacement hypocycloidal crankshaft, the piston assembly comprises a connecting rod and a piston, wherein the connecting rod is operably engaged to the piston at a first end of the connecting rod, and wherein the connecting rod is operably engaged to the external pin at a second end of the connecting rod for converting the continuous rotation of the crankshaft to the linear displacement of the piston. The radius of the crankshaft may be about twenty-five percent of the maximum linear displacement of the piston assembly. The pitch diameter of the internal gear may equal the maximum linear displacement of the piston assembly. In one variation, the pitch diameter of the internal gear may be double the pitch diameter of the external gear. The linear displacements of the piston assembly may, in one example, be varied by modifying the angle set by the angle setting device.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A variable displacement hypocycloidal crankshaft for converting a continuous rotation of a crankshaft to reciprocating linear displacement of a piston assembly, the variable displacement hypocycloidal crankshaft comprising:

said crankshaft mounted in a chassis configured to house the piston assembly;

a hypocycloidal gear assembly comprising an internal gear and an external gear, wherein the crankshaft mounted in the chassis is coaxial to the internal gear, wherein the crankshaft freely rotates in the center of the internal gear thereby rotating the internal gear, and wherein the external gear is mounted on a crankshaft movable pin;

an external pin configured on the external gear to operably engage the piston assembly;

an angle-setting device comprises a spring, mounted on the chassis, and operably engaged to the internal gear, wherein the spring stores power by gathering and allowing the internal gear to change the angle while blocking the motion direction of the piston; the change in angle is continued to reach the external pin to the end of the motion direction and begins to return, via the power stored in the spring, in the direction returning from the external pin, thereby returning the internal gear to its original position, wherein the angle-setting device is coaxial to the hypocycloidal gear assembly for selectively varying the reciprocating linear displacement of each piston in the piston assembly; and wherein the external gear meshes with the internal gear of the hypocycloidal gear assembly for converting the continuous rotation of the crankshaft to reciprocating linear displacement in the piston assembly, and wherein the reciprocating linear displacement of each piston in the piston assembly is reduced by more than 86%.

2. The variable displacement hypocycloidal crankshaft of claim 1, wherein the piston assembly comprises a connecting rod and a piston, wherein the connecting rod is operably engaged to the piston at a first end of the connecting rod, and wherein the connecting rod is operably engaged to the external pin at a second end of the connecting rod for converting the continuous rotation of the crankshaft to the reciprocating linear displacement of the piston.

3. The variable displacement hypocycloidal crankshaft of claim 1, wherein a radius of the crankshaft is about twenty-five percent of the maximum reciprocating linear displacement of the piston assembly.

4. The variable displacement hypocycloidal crankshaft of claim 1, wherein the pitch diameter of the internal gear equals the maximum reciprocating linear displacement of the piston assembly.

5. The variable displacement hypocycloidal crankshaft of claim 1, wherein the pitch diameter of the internal gear is double the pitch diameter of the external gear.

6. The variable displacement hypocycloidal crankshaft of claim 1, wherein the reciprocating linear displacements of the piston assembly is varied by modifying the angle set by the angle setting device.

* * * * *